United States Patent [19]

McClelland et al.

[11] E Re. 29,635

[45] Reissued May 23, 1978

[54] ROW FOLDING SEATING STRUCTURE

[75] Inventors: Robert G. McClelland, Grand Rapids, Mich.; David W. Raymond, Champaign, Ill.

[73] Assignee: American Seating Company, Grand Rapids, Mich.

[21] Appl. No.: 622,144

[22] Filed: Oct. 14, 1975

Related U.S. Patent Documents

Reissue of:

[64] Patent No.: 3,667,171
Issued: Jun. 6, 1972
Appl. No.: 104,917
Filed: Jan. 8, 1971

[51] Int. Cl.[2] ..... F04H 3/12
[52] U.S. Cl. ..... 52/9; 108/91
[58] Field of Search ..... 52/8–10, 52/6, 183; 108/91

[56] References Cited

U.S. PATENT DOCUMENTS

| | | | |
|---|---|---|---|
| 3,117,350 | 1/1964 | Margadant | 52/8 |
| 3,279,131 | 10/1966 | Curra | 52/9 |
| 3,352,069 | 11/1967 | Curra | 52/9 |
| 3,429,081 | 2/1969 | Robinson | 52/9 |

OTHER PUBLICATIONS

Fred Medart Products Inc., 3535 Dekalb St., St. Louis, Mo., 1959, p. 13.

*Primary Examiner*—John E. Murtagh
*Attorney, Agent, or Firm*—Emrich, Root, O'Keeffe & Lee

[57] ABSTRACT

In a row seating structure a series of telescoping rows are provided, each row having spaced vertical carriage-mounted columns, each having a cantilever arm adapted to rest upon the next adjacent column when the telescoping structure is extended and a transverse rear riser beam connecting the columns in the row and equipped with forwardly extending supporting arms anchored at their rear upon the riser, and a spectator tread or platform supported by the arms, the arms also providing a seat above the forward end of the tread panel or platform.

18 Claims, 24 Drawing Figures

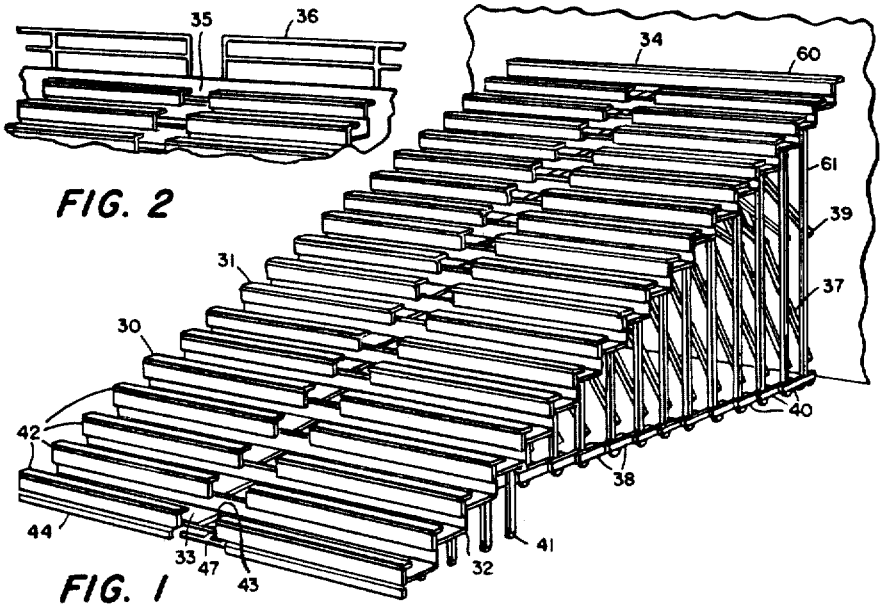
FIG. 2
FIG. 1
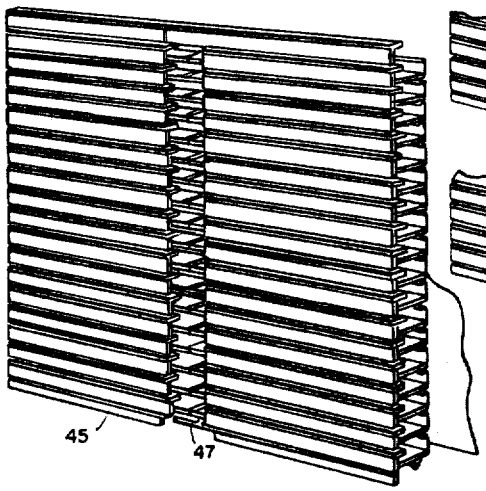
FIG. 3
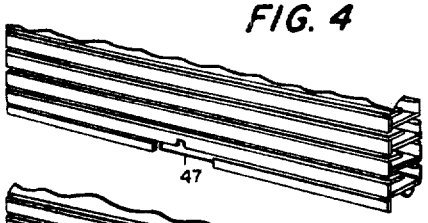
FIG. 4
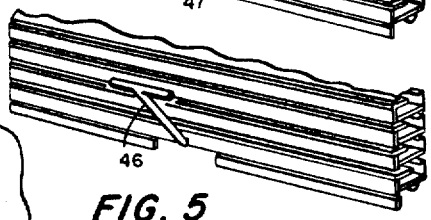
FIG. 5

ROW FOLDING SEATING STRUCTURE

Matter enclosed in heavy brackets [ ] appears in the original patent but forms no part of this reissue specification; matter printed in italics indicates the additions made by reissue.

A problem is presented in the fabrication of the telescoping seating structure in providing access to the seats by way of aisles, while at the same time enabling the structure to be readily advanced to open position and retracted to closed position. Further, it is important to provide means for supporting tread panels or platforms with seats thereabove and a substantial space between the riser or kickboard and the forward end of the panel. Problems are presented also in providing antifriction means for effecting guiding of the rwo sections during movement to advanced and retracted positions, while also effectively locking the structure in advanced position to a rigid, sturdy structure with means for unlocking the locks as the rows are retracted.

We have discovered that through the utilizing of a single metal rear riser beam for each row, while extending from the riser arms to support the tread panel and seat support, a sturdy structure is provided which enables a portion of the seat to be cut away, because this is nonsupporting structure, and thus to provide an aisle which may be located centrally of the platform or along the side, or at any area of the platform. Further, by utilizing guide mechanism and antifriction elements and lock elements, a telescoping seat structure is provided which is sturdy and rigid in the extended position, but which is readily moved to retracted to closed position.

In the accompanying drawings,

FIG. 1 is a perspective view of a folding bleacher or telescoping seat structure provided with a central aisle and extended in front of a continuous wall;

FIG. 2, a broken perspective view of the bleacher unit in front of a balcony, arranged so that the unit can be top-loaded with spectators from the balcony;

FIG. 3, a perspective view of the bleacher unit folded into stored position in front of the wall;

FIG. 4, a fragmentary perspective view of the lower portion of a similar bleacher unit, but without the central aisle, to show the handle to be employed in extending the unit to an open position;

FIG. 5, a view similar to FIG. 4, showing the handle raised to pull the closed unit into the extended position;

FIG. 6, a layout of the special forwardly extending support arm; already cut and pierced, ready to be bent into shape;

FIG. 7, a perspective view of the forwardly extending support arm after the first set of folds has been made;

FIG. 8, a perspective view of the bracket in its final bent-up form with the corners welded together;

FIG. 9, a broken respective view of the end of the lower rear riser made of metal, formed into a structural shape to replace the usual wooden plank;

FIG. 10, a perspective view of a similar smaller bracket which is connected to the cantilever arm;

FIG. 11, a detailed sectional view, the section being taken through one row of the bleacher unit to show a wide foot space in back-to-back row spacing by use of the recessed lower rear riser and open front seat support;

FIG. 12, a perspective view of the ends of the first four rows of the bleacher unit showing the added end support posts and wheels;

FIG. 13, a top plan view of a complete 19 row unit showing the methods of supporting the structure from below on both sides of the unit, with a center aisle in all but the last row, the end support posts for the lower rows being shown as small square;

FIG. 14, a perspective view of a tread board which may be 20 feet long, or longer, made by using two long panels for treads, the panels being held together by an H-shaped center support, and the ends of the panels being protected by channel-shaped strips;

FIG. 15, a broken side view of the lower portion of the posts and bases to show the operation of the lower row locks;

FIG. 16, a fragmentary perspective view of the upper portion of several rows to show the functioning of the upper row locks;

FIG. 17, a perspective view of the two columns or posts to show how the cantilever arms are attached to the side of a column and are offset in their shape as to be directly over the preceding column or posts;

FIG. 18, a top view of two column carriages or bases and showing the rollers between the carriages, thus keeping them aoart when extended;

FIG. 19, a view aimilar to FIG. 18, but showing the carriages or bases in a folded position with the two rollers keeping them separated;

FIG. 20, a fragmentary perspective view of one set of pulleys and cable mounting bracket;

FIG. 21, a fragmentary top view of part of the unit to show one complete cable and pulley unit for keeping the row always in a parallel position with respect to the preceding and following rows;

FIG. 22, a sectional view of four partial rows of seats to show the functioning of the cable and pulley system, the upper row being fully extended, a middle row being partially folded, and the lower row being completely folded;

FIG. 23, a broken perspective view of the last row seat bracket attachment at the top of the last post or column; and FIG. 24, a broken perspective view of brace members which may be used.

DETAILED DESCRIPTION

Before describing the structure in detail, certain particular features of the complete telescoping seating structure should be described. We have provided a single riser for each row to connect the columns in the row and to provide forwardly extending arms which have at their forward ends vertical portions supporting an elevated bench or seat and with a platform carried by the arms and rests on the lower flange of the riser. Such a structure is important because it permits the seat structure, which is nonsupporting, to be cut away at any desired point so as to provide an aisle extending upwardly along the seating structure. We prefer to employ a board closure or top riser below the seat portion to provide an aisle at the selected point along the seating structure.

The carriage structures for the main columns are normally held apart by the brace structure, but in order to prevent one carriage from striking the other and creating friction in the folding and unfolding of the structure, we provide rollers along the sides of the carriage wheels to eliminate such friction. We have also provided lightweight, but extremely sturdy support arms attached to and extending forwardly from the rear riser so as to support a tread board and a seat thereabove with extensive foot room and heel room therebetween, the tread board or platform extending forwardly of the lower rear riser to facilitate cleaning of the platform so that debris will fall forward on the next row, rather than through the structure to the floor. In this structure the rear riser is a channel with the flanges facing the front so that the rear of the platform or tread board can rest on the lower flange of the riser. The telescoping seat structure has horizontally extending arms of one row, positioned at a slightly higher elevation than the top of the vertical columns of the next forward row to the front, so that the arms and columns can move freely with respect to each other when the structure is in the unloaded position, the arms being attached so as to deflect down and contact with said columns when a spectator load is applied to the structure in the extended position.

We also prefer to employ, in combination with the rows, cable and pulley structures causing the row sections to be maintained in parallel during telescoping travel; also, we employ locks in the lower portion of the structure with the locks having extended tabs which will be engaged by the lower riser channel of row one, which acts as a trip member striking the extended tabs and disengaging the lock bar as the lower sections are folded. We prefer to employ in combination therewith upper row locks of unique construction which provide an early disengagement of the locks, so that there is no obstruction or delay in the unlocking during the folding of the rows.

Figures 6, 7, 8, 9, 10, 11:
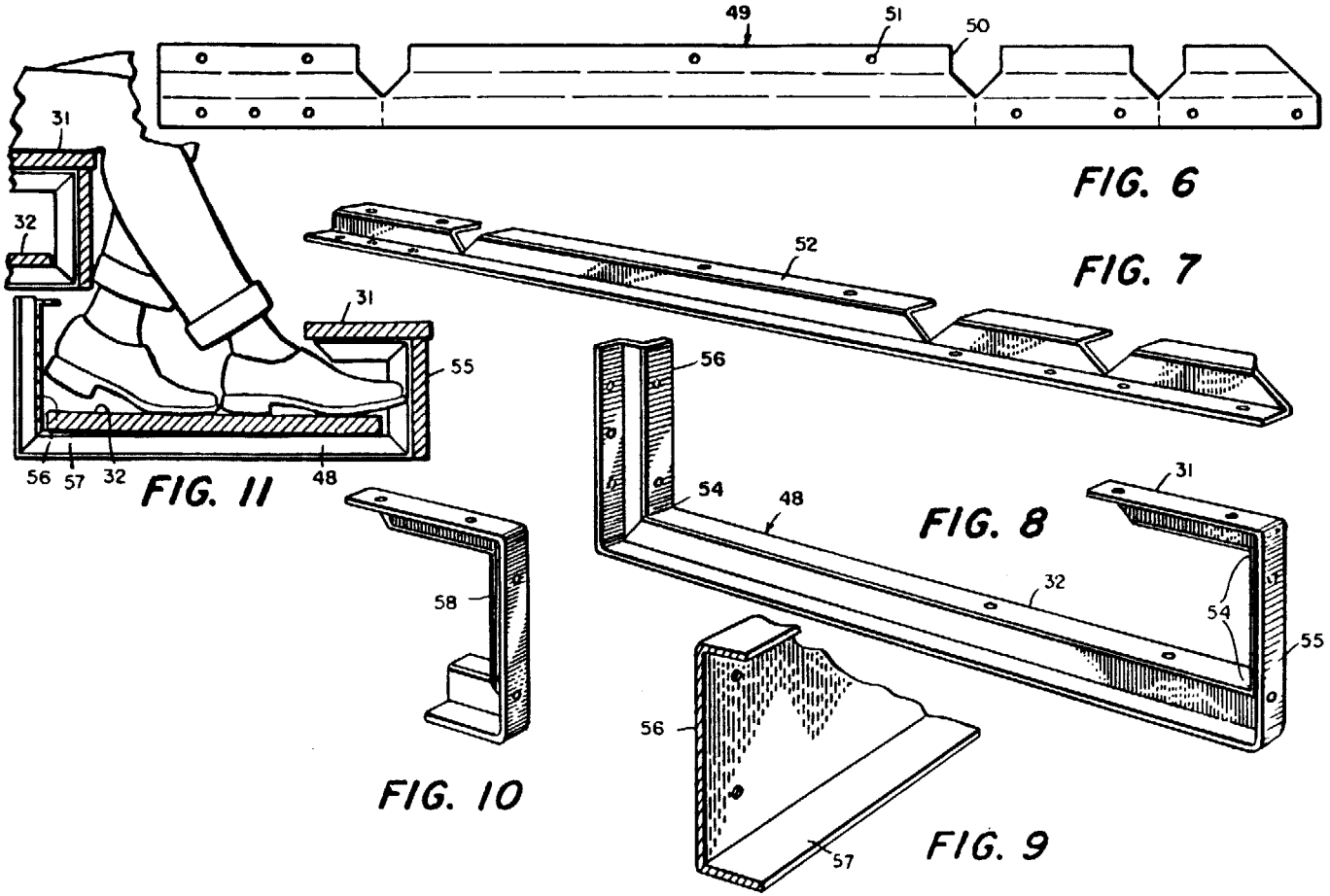
Figure 12:
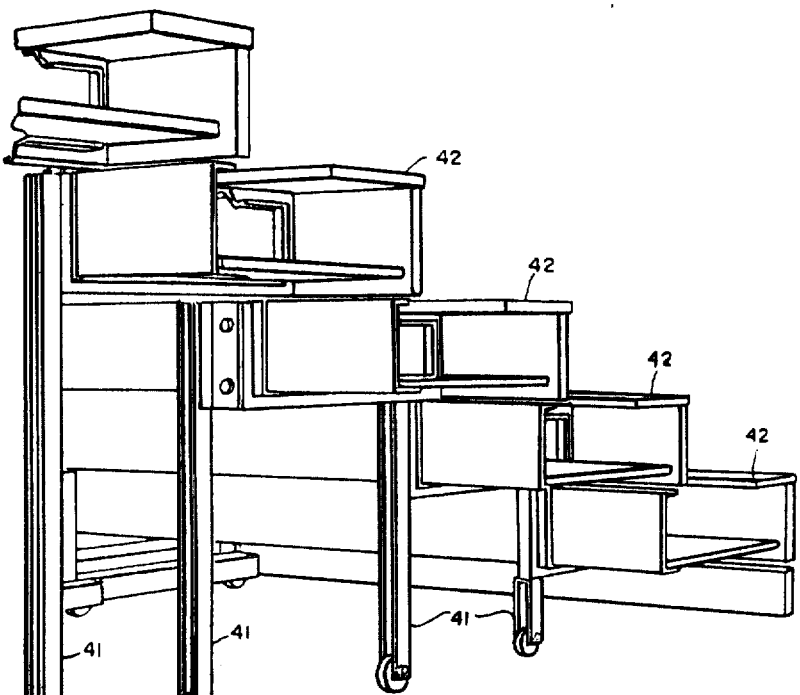
Figure 13:
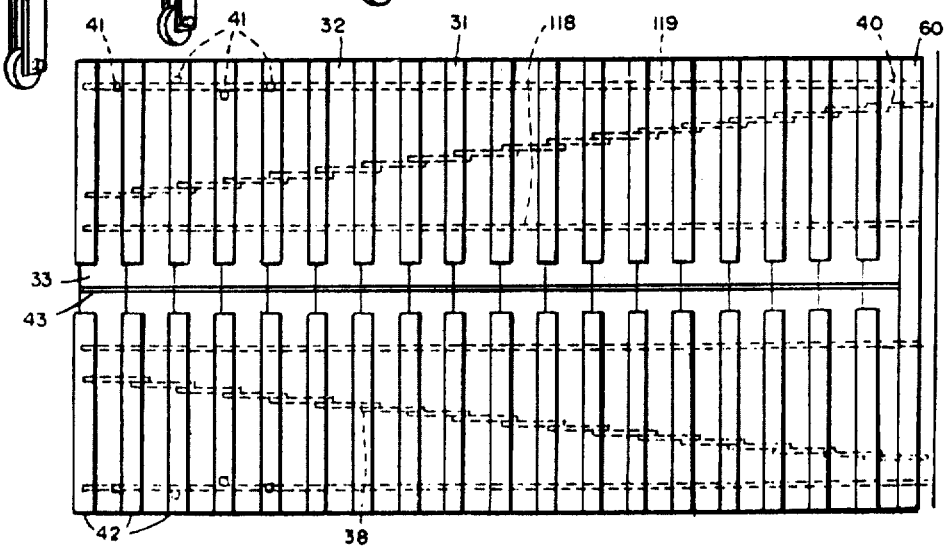
Figure 20:
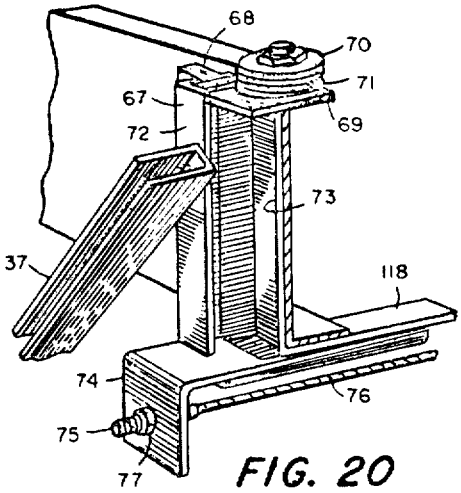
Figure 21:
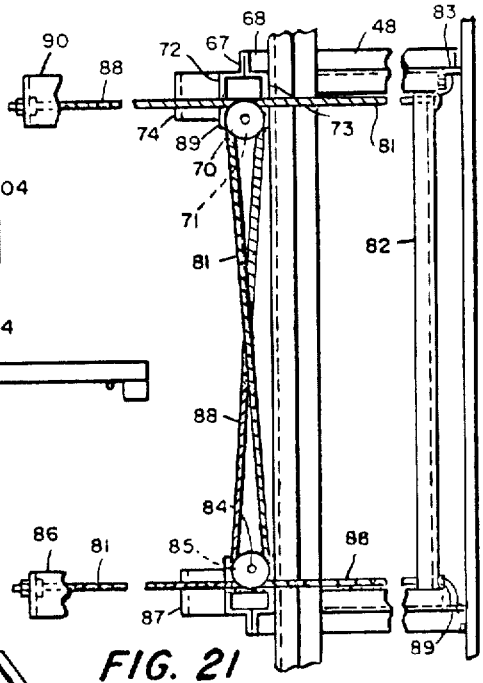
Figure 22:
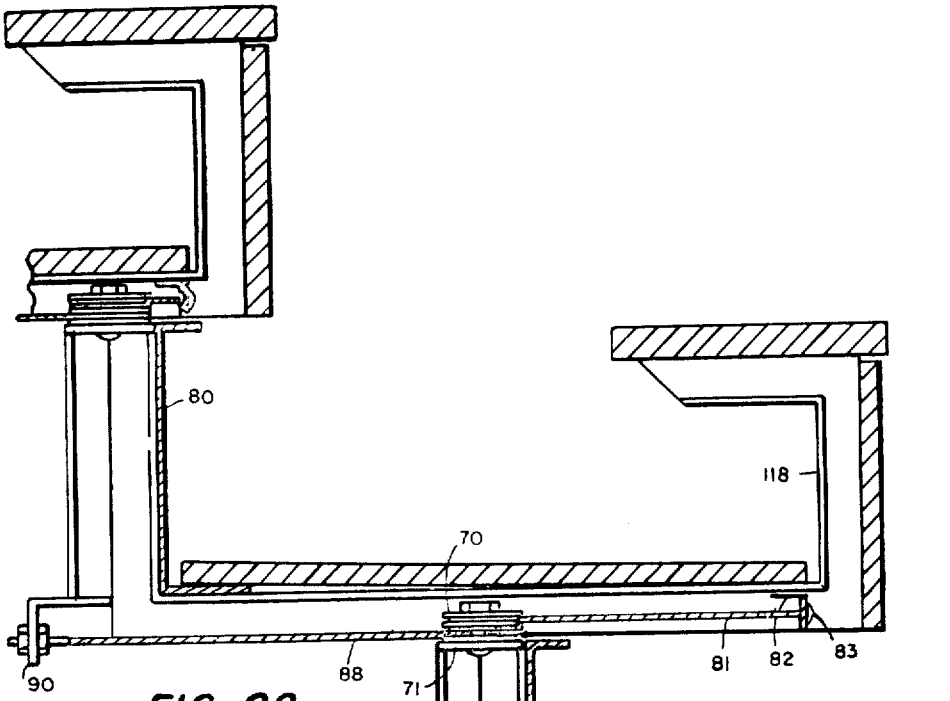
Figure 23:
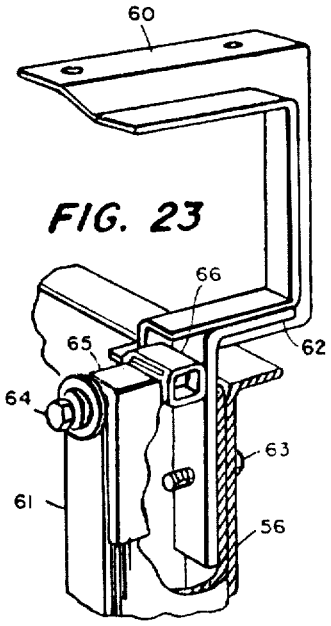

Turning to the specific structure (FIG. 1), the folding and extending bleacher unit 30 has seatboards or benches 31, tread panels 32, a center aisle 33, an opening 35 to a balcony 36 beyond, a system for bracing 37 of the rows 38 with an added series of upper braces 39 for the higher rows 40 for added sturdiness, and added end support posts 41 at the extremities of the first four rows, as well as sliced tread panels 32 with H-shaped channel 43. It is extended 44 (FIG. 1) or closed 45 (FIG. 3) manually by means of a handle mechanism 46 which is stored 47 below the first row in a key-locked concealed location. Referring to FIGS. 6, 7, 8, 9, 10 and 11, a lightweight but sturdy forwardly extending support arm 48 is made from a single piece of metal 49, which is cut to shape 50 and pierced 51, then bent into a z-angle shape 52 before being further bent into a channel shape 48, and welded in three locations 54. The completed support channel 48, has supporting surfaces for a seatboard 31, front board top riser 55, tread panel 32 and a channel or lower riser beam 56. The kick channel 56 is thin in comparison to a previously used wooden plank. It is sturdy, and has structurel use, and bottom flange 57 supports the rear edge of the tread panel 32. FIG. 11 shows how the use of the lower riser 56, in conjunction with the support channel 48, allows a 25 inch foot space in a 22 inch back-to-back spacing. A similar but simpler seat support channel 58 is used in conjunction with the cantilever arm 59 (FIG. 15), and again in the top row 60 (FIG. 23) where it is mounted to the top of the last post 61 by means of an angle 62 and bolt 63 through the lower riser 56, and held firmly in place by a second bolt 64 from the rear between the top of the post and a side angle 65 and through a piece of square tubing 66. A system of cables and pulleys may be employed to keep the rows parallel to other row as they are extended or folded. FIG. 20 shows one complete pulley and cable set-up. A short z-angle 67 is attached to the rear flange of the forwardly extending support arm 118. A plate 69 for holding a pulley is attached to the outer flanges 72 and 73 of the z-angle 67 and arm 118, respectively, at their upper endings. A small angle bracket 74 is attached at the lower end of z-angle 67. A brace 37 also attaches to the z-angle near its upper end. The rear ending 75 of a cable 76 with its adjustment 77 attaches to the angle bracket 74. Upon observing FIGS. 21, 21 and 22, it can be readily seen that in one cable attachment assembly the pulleys at the top operate with the cables of the next row, while the cable below the assembly operates with the set of pulleys in the proceding row. In FIG. 22, there is a bleacher row 78 that is completely closed, a row 79 that is partially closed, and a row 80 that is fully extended. As shown in FIGS. 21 and 22, cable 81 is attached to member 82 at the front of the row. Then it goes around the upper groove of pulley 70 of the preceding row, crosses over and goes around the groove of pulley 84 of the preceding row, and proceeds rearward until it is attached to bracket 86. Cable 88 is threaded in like manner using the lower grooves in pulleys 70 and 84 but starting on the opposite end of member 82 and ending at bracket 90. Row 79 with its pulleys is thus guided by the cables mounted on the underside of row 80.

Figure 14:
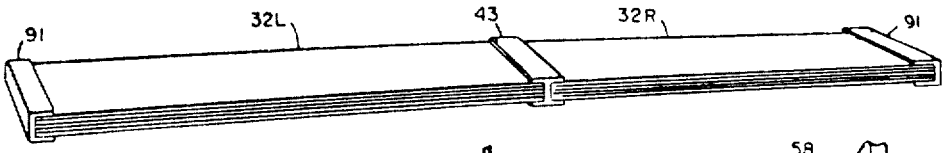

In FIG. 14, we see that the full length platform is achieved by using two pieces of tread panels 32L and 32R and spaced with a piece of H-shaped channel 43. The ends of the tread panels are protected by member 91.

Figure 15:
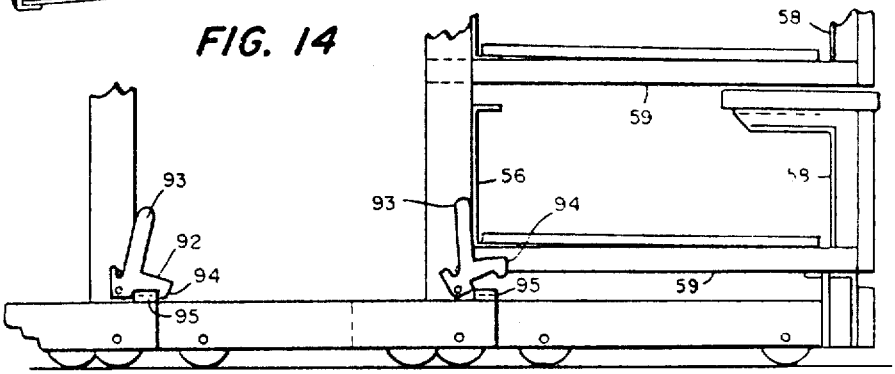

The bleacher unit is equipped with a set of wheel carriage locks. In FIG. 15 we see how the lower locks 92 operate. The first lock, not shown, must be unlocked manually by pulling out the operating handle 47 into its position for use 46, (FIGS. 4 and 5). Then as the unit is closed, the lower riser 56 of the first row strikes the lever arm 93 of all the other locks pushing each one rearward, forcing the lock finger 94 up, away from the lock angle 95 of the next row so the section can be closed into the next row sequence.

Figure 16:
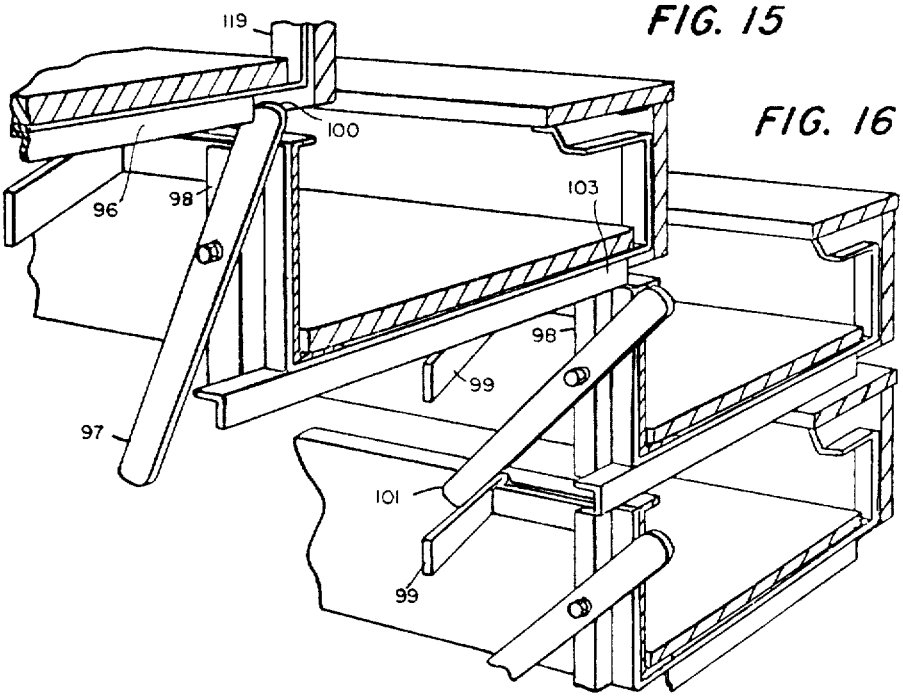

The upper locking mechanism is shown in FIG. 16. It consists of a stop angle 96 attached to the power portion of the outer support channel 119 of the next row, a locking lever 97 which is free to swing outward and attached to the rear portion 98 of the support channel, and lock releasing arm 99 also attached to the rear portion 98 of the preceding support channel.

When the section is extended, the locking lever 97 is free to fall into the small space 100 in front of the angle stop 96, where it stays, preventing the section from moving. As the preceding row closes, its lock releasing arm 99 will strike the lower end of the locking lever 97, swinging the upper portion out of its space 100 in front of the angle stop 96, as it appears at 101 with the lock release arm 99 holding it out, away from the stop 103. The unlocking action occurs early in the closing operation of each section so that there is no danger of a jamming of the unit due to an upper lock not unlocking in time.

Figure 24:
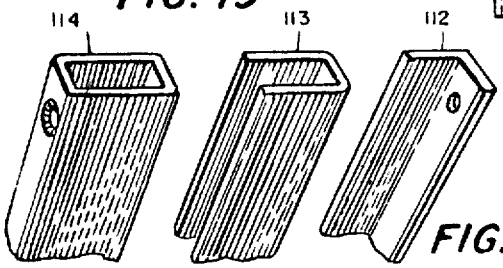

In FIG. 24 are shown brace members which may be used, the members being numbered 112, 113 and 114.

Figure 17:
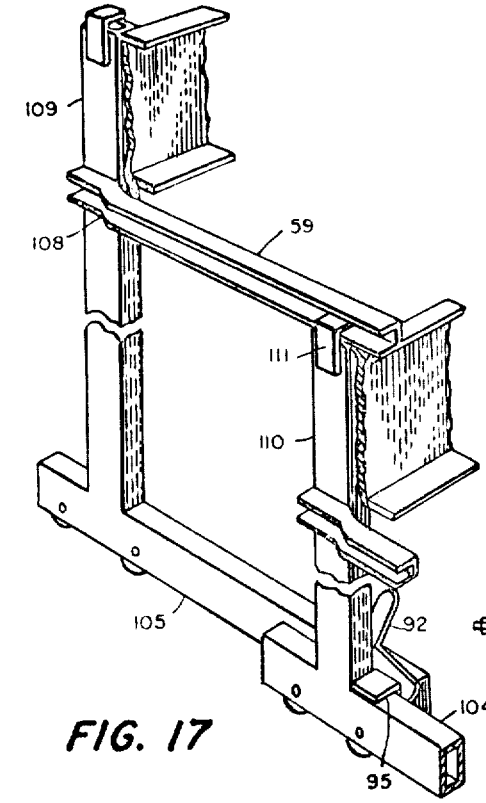
Figure 18:
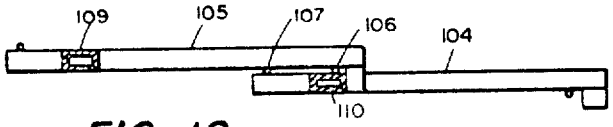
Figure 19:
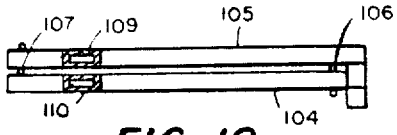

Referring to FIGS. 17, 18 and 19, we see that as the sections are closed or extended, the bases 104 and 105 are kept slightly apart by a front roller 106 on base 105 and a rear roller 107 on base 104. The bases normally stay apart and these rollers help to keep the sections parallel at all times, being an added aid to the cable and pulley alignment system.

The tread cantilever arm 59 is offset at 108, just ahead of its attachment to the inner side of the post 109, so that it is centered above the preceding post 110 which bears its weight when in use. An angle bracket 111 at the top of the post 110 retains cantilever arm 59 alignment in relationship to post 110. Another angle bracket on a post at the opposite side of the row also helps in retaining the row in alignment the opposite direction.

While in the foregoing specification we have set out a specific structure in considerable detail for the purpose of illustrating specific embodiments of the invention, it will be understood that such details may be varied widely by those skilled in the art without departing from the spirit of the invention.

We claim:

1. A seating structure comprising a plurality of telescoping rows *each having a bleacher seat portion at the forward end thereof and* arranged for movement between extended and retracted positions, each row *further* including two wheel-equipped carriage members, a vertical column mounted on each carriage member and provided with a cantilever arm adapted to be supported on the top of the next adjacent row toward the front of the seating structure when the structure is in extended position, a rear riser member *comprising a metal beam, said beam* connecting the upper portion of the columns, forwardly-extending support arms anchored upon said rear riser and structurally supported over the rear riser member of said next adjacent row when the seating structure is in extended position, and a platform on said support [arms.] *arm; said metal beam having means for continuously supporting the rear edge of said platform, said riser providing sufficient structural support to permit the seat portion of a row to be removed to provide an aisle at the footrest level.*

2. The structure of claim 1 in which said support arms anchored upon said riser have at their front upwardly- and rearwardly-turned portions with *cantilevered* seatboards carried by said rearwardly-turned portions[.] *said structure providing unobstructed toe room beneath said seatboards for each row section.*

3. The structure of claim 1 in which said riser is a channel with upper and lower flanges facing forwardly and with the lower flange providing a rest for the rear edge of said platform, said riser providing the only transverse structural member.

4. The structure of claim 2 in which said support arms are Z-shaped in cross-section.

5. The structure of claim 2 in which said support arms have upwardly-turned rear portions anchored to the rear of said riser.

6. The structure of claim 1 in which the forwardly extending arms of one row are positioned slightly above the top of the columns of the next adjacent forward row, so that the arms and columns may move freely with respect to each other when the seating structure is unloaded, but with said arms deflecting and contacting said columns for support when the structure is extended and a spectator load is applied.

7. The structure of claim 2 in which seatboard portions of adjacent rows are cut away to provide an aisle[.] *at the foot rest level.*

8. The structure of claim 2 in which an upper riser can be secured to the upwardly-extending portions of the support arms.

9. The structure of claim 8 in which said upper riser and seatboard thereabove are cut away at a selected area in adjacent rows to provide an aisle.

10. The structure of claim 1 in which locks equipped with tabs extending are provided near the bottom of the row sections for locking the sections in extended positions, but are released by the trip action of the front lower riser engaging the tab extensions on the locks as the row sections are retracted.

11. The structure of claim 1 in which the platforms in the front rows of the seating structure are equipped at their outer extremeties with wheel-equipped posts.

12. A seating structure comprising plurality of telescoping seat rows arranged for movement between extended and retracted positions, each row including at least a pair of wheel-equipped carriage members, a vertical column mounted on each carriage member and provided with a cantilever arm adapted to be supported on the top of the column of the adjacent row toward the front of the seating structure when the structure is in extended position, a rear riser member mounted upon the upper portions of the columns in the row, seat support arms anchored upon said riser and extending forwardly above and beyond the rear riser member of said next adjacent row when the seating structure is in extended position, cable and pulley members connecting successive rows so as to guide seat rows in parallel movement during the movement of the structure to extended and retracting positions, and row locks securing the rows together when the seating structure is in extended position and being automatically unlocked as the rows are moved to retracted position, with handle mechanism stored below first row in a locked position.

13. The structure of claim 12 in which said carriage members are provided with side walls enclosing wheels therebetween and said carriage members are provided with antifriction rollers mounted upon vertical pivots.

14. The structure of claim 12 in which said support arms carried by said rear riser member are Z-shaped in cross section.

15. The structure of claim 1 with said rear riser recessed in relation to said forwardly extended support arms of the adjacent row, having said upwardly- and rearwardly-turned portions at the front of said support arms providing an [unobstructive] *unobstructed* area for spectator foot movement and platform maintenance operations.

*16. The structure of claim 1 wherein said support arms include means for supporting said platform from beneath and are located at spaced intervals along the length of said platform.*

*17. In a seating structure including a plurality of telescoping row sections arranged for movement between an extended position in which said row sections are in stepped relation and a retracted position in which said row sections are vertically aligned, each row section including a pair of wheel-equipped carriages for support, a vertical column mounted on each carriage, a forwardly-extending cantilever arm secured to each column and adapted to be supported on the top of the subjacent row section when the system is in said extended position, the improvement comprising, in each row section: a rear riser being a metal beam connected between said columns and including upper and lower horizontal flanges and a web between said flanges, said lower flange extending forwardly of the bottom of said web to provide a recess for increased heel room extending beneath the forward portion of the next higher row section when said structure is in said extended position; a plurality*

*of forwardly-extending support arms mounted to said rear riser; the forward portions of said cantilever arms and said support arms extending above the rear riser of the subjacent row section when the system is in said extended position and being equipped with upright members at the forward ends thereof and rearwardly extending upper members extending from the tops of said upright members; seatboards mounted on said rearwardly extending upper members; and a platform supported by said support arms and said cantilever arms; the rear edge of said platform supported by said lower flange of said riser beam; said improvement characterized in that said seatboards are supported in cantilever whereby the space beneath said seatboards is wholly unobstructed for increased toe room and ease of platform maintenance, and in that the front-to-back foot room of each row section is greater than the row-to-row spacing of said system.*

*18. The structure of claim 17 wherein said platform extends horizontally from the base of said web of said riser beam to a location adjacent the base of said upright members at the distal end of said cantilever and support arms.*

* * * * *